Aug. 16, 1927.  
F. L. WILLRODT  
1,639,246  
STEERING ATTACHMENT FOR TRACTORS  
Filed June 30, 1926  
4 Sheets-Sheet 1

INVENTOR.  
*Fred L. Willrodt,*  
BY  
*Geo. P. Kimmel.*  
ATTORNEY.

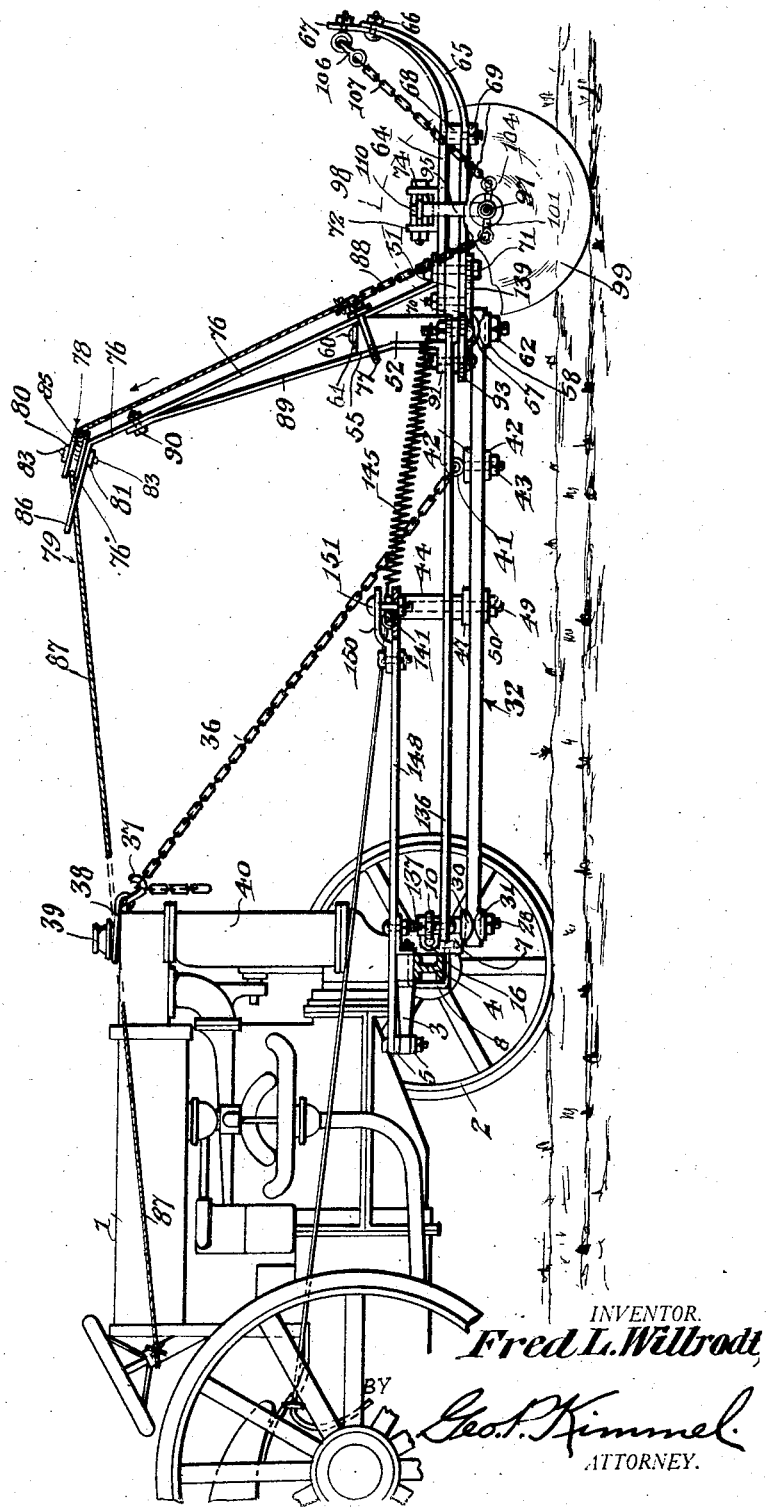

Aug. 16, 1927.
F. L. WILLRODT
1,639,246
STEERING ATTACHMENT FOR TRACTORS
Filed June 30, 1926 4 Sheets-Sheet 3
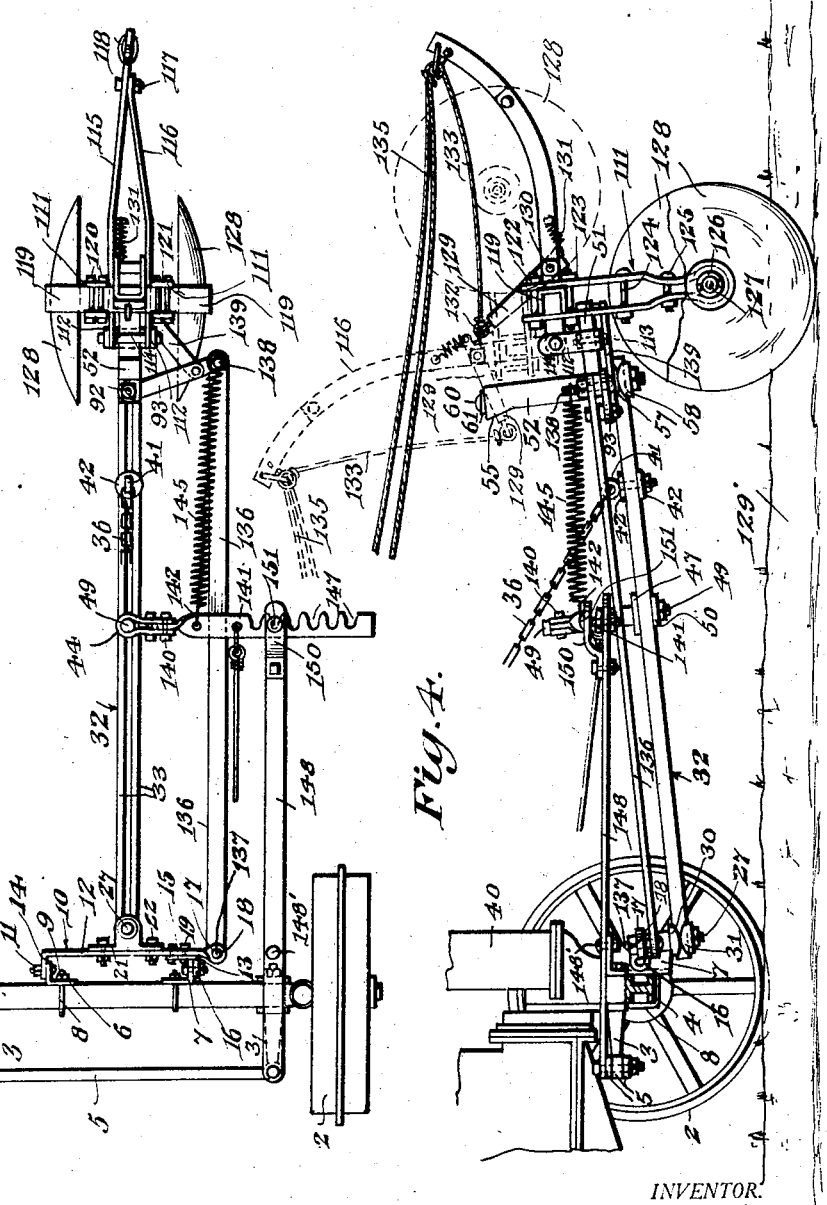
INVENTOR.
*Fred L. Willrodt,*
BY
*Geo. P. Kimmel,* ATTORNEY.

Aug. 16, 1927.
F. L. WILLRODT
1,639,246
STEERING ATTACHMENT FOR TRACTORS
Filed June 30, 1926
4 Sheets-Sheet 4

Patented Aug. 16, 1927.

1,639,246

UNITED STATES PATENT OFFICE.

FRED L. WILLRODT, OF PUKWANA, SOUTH DAKOTA.

STEERING ATTACHMENT FOR TRACTORS.

Application filed June 30, 1926. Serial No. 119,656. REISSUED

This invention relates to a steering attachment for tractors, and has for its object to provide an attachment of such class, in manner as hereinafter set forth, for steering a tractor when listing corn or when cultivating listed corn or to follow a furrow previously formed, whether positioned at either side or beneath the tractor for the purpose of guiding the latter when employed in connection with ground working devices coupled to the rear thereof.

Further objects of the invention are to provide, in a manner as hereinafter referred to, a steering attachment for the purpose set forth, which is comparatively simple in its construction and arrangement, strong, durable, compact, readily installed with respect to the tractor, and comparatively inexpensive to set up.

With the foregoing and other objects in view, the invention consists of the novel construction, combination and arrangement of parts as hereinafter more specifically described and illustrated in the accompanying drawings, wherein is shown an embodiment of the invention, but it is to be understood that changes, variations and modifications can be resorted to which fall within the scope of the claims hereunto appended.

In the drawings wherein like reference characters denote corresponding parts throughout the several views:

Figure 2 is a fragmentary view, in side elevation of a tractor showing the adaptation therewith of the steering attachment in accordance with this invention.

Figure 3 is a top plan view illustrating the forward axle of a tractor and further illustrating in connection therewith a steering attachment in accordance with this invention, but with the attachment provided with a modified form of guiding means.

Figure 4 is a side elevation of the attachment when extended from the front axle of the vehicle and further illustrating the modified form of guiding means in full lines in active position and in dotted lines elevated from active position.

Figure 5 is a section on line 5—5, Figure 1.

Figure 6 is a section on line 6—6, Figure 1.

Figure 7 is a section on line 7—7, Figure 1.

Figure 8 is a section on line 8—8, Figure 1.

Figure 9 is a fragmentary view in front elevation of the upper end of the support carrying the guiding device for the elevating and lowering member.

Figure 1:
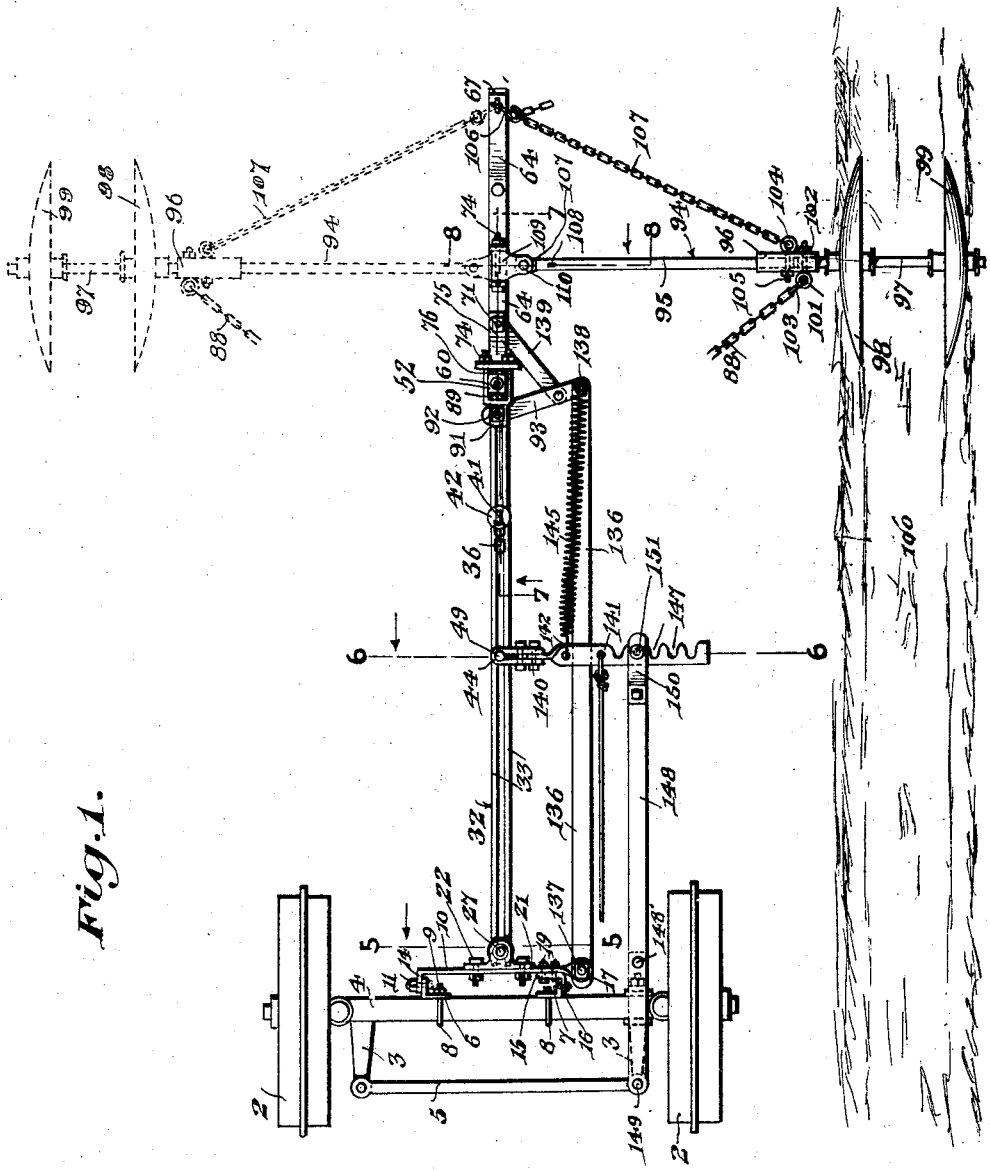
Figure 1 is a plan view illustrating the front axle of a tractor and showing the adaptation therewith of a guiding attachment in accordance with this invention, and further with the attachment shown in full lines as extended from one side of the tractor and in dotted lines when extended from the other side thereof.

Referring to the drawings 1 denotes a tractor, 2 the front wheels thereof, 3 the axle spindles for the wheels 2, 4 the front axle and 5 the connecting rod between the spindles 3. The foregoing are of known construction.

Positioned against the front of the axle 4 is a pair of spaced oppositely disposed angle irons 6, 7, each consisting of an inner arm abutting against the axle 4 and an outer arm which is disposed in a plane lengthwise of the tractor 1. Yokes 8 overlap the axle 4, and the free ends of their arms project forwardly therefrom and extend through the inner arms of the angle irons 6, 7 and the forwardly extending ends of the yokes carry clamping nuts 9 which fixedly secure the angle irons 6, 7 to the axle 4. Positioned against the outer faces of the outer arms of the angle irons 6, 7 as well as projecting a substantial distance forwardly from said angle irons, is a yoke-shaped member 10 having its length extending in the direction of the length of the axle 4. The ends of the member 10 are pivotally connected to the outer arms of the angle irons 6, 7, as at 11. The angle irons 6, 7 extend above and below the axle 4, see Figure 5. The U-shaped member 10 is constructed of two sections one of which is indicated at 12 and the other at 13. One end of the section 12 is bent at right angles and extends rearwardly as at 14 and abuts against and is pivotally connected to the outer arm of the angle iron 6. The section 13 is of angle shape and is opposite the angle iron 7 and includes a transversely disposed arm 15 and a longitudinally extending arm 16. The arm 15 opposes the inner arm of the angle iron 7 and is further positioned against the inner face of the section 12. The arm 16 opposes the outer arm of the angle iron 7 and is pivotally connected therewith as at 11. That end of the section 12, opposite the end 14 thereof projects outwardly from the arm 16 of the section 13 and is torsionally twisted as well as further shaped to form a circular terminal 17 provided with a vertically disposed opening 18. See Figure 5. The member 10 is positioned intermediate the upper and lower ends of the angle irons 6, 7. The arm 15 of the section 13 of the member 10 is fixedly secured to the section 12, by the hold-fast devices 19.

Arranged against the front of the member 10 centrally thereof, is a vertically disposed tubular bearing 20 extended above the axle 4 and provided with a pair of oppositely extending apertured lugs 21, through which extend hold-fast devices 22 for fixedly securing the bearing 20 to the front of the member 10. See Figure 5. The lower end of the bearing 20 is flush with the lower edge of the member 10. Arranged below the lower end of the tubular bearing 20, is a collar 23 and interposed between the latter and the bearing 20 is a washer 24. Positioned against the lower end of the collar 23 is a washer 25. Extending through the bearing 20, washer 24, collar 23, washer 25 and depending a substantial distance below the latter, is a pivot bolt 26, provided at its upper end with a head 27 and having its lower terminal portion threaded as at 28. Interposed between the head 27 and the top of the bearing 20 is a washer 29. Mounted on the lower portion of the pivot bolt 26, is a pair of oppositely disposed coupling members 30, 31 and which are arranged in spaced relation. The coupling member 30 is of inverted channel-shape and the coupling member 31 is channel-shape. Extending between the coupling members 30, 31 as well as projecting rearwardly therefrom, is a beam 32 which is of appropriate length and projects forwardly a substantial distance from the coupling members 30, 31. The beam 32 is formed of a pair of lengthwise extending spaced bars 33 between which extends the pivot bolt 26, and the latter extends down through the coupling member 31. Mounted on the threaded lower terminal portion 28 of the pivot bolt 26 is a securing nut 34 and interposed between the nut 34 and the coupling member 31 is a washer 35. The beam 32 is termed a carrier and is pivotally connected with the front axle 4 through the medium of the bolt 26 and bearing 20. The connection just stated provides for the swinging of the carrier on a vertical axis. The carrier is furthermore swung on a horizontal axis in view of the pivotal connections between the member 10 and the angle irons 6, 7.

A combined brace and supporting element is provided for the carrier 32 and said element consists of a chain 36 adapted to have the upper portion thereof adjustably connected to a hook 37, which is supported by a holder member 38 secured to the filling tube 39 for the radiator 40 of the tractor. The links of the chain 36 selectively engage with the hook 37 for the purpose of elevating the carrier 32 when desired and further for bracing the carrier when the latter is in a lowered position. The lower end of the chain 36 is connected to an eye bolt 41 which is secured by the washers 42 and nut 43 to the carrier 32 near the forward end thereof.

Supported above the carrier 32, rearwardly of the eye bolt 41 is a yoke-shaped clamp 44 which seats on a spacing collar 45, mounted on a washer 46 and interposed between the latter and the carrier 32 is a spacing disk 47. Extending down through the clamp 44, collar 45, washer 46, disk 47, carrier 32 and depending below the latter, is a bolt 48 provided with a head 49 which seats on the top of the clamp 44. The lower end of the bolt 48 carries a securing nut 49, and interposed between the latter and the carrier 32 is a washer 50. The construction aforesaid provides a support for the clamp 44, as well as pivotally connecting the same with the carrier 32. The function of the clamp 44 will be presently referred to.

Arranged over the forward end of the carrier 32, as well as being spaced therefrom, is a casting which provides a support and consists of a rectangular base 51 and a tubular standard 52 which is integral with the upper face of the base 51 at a point between the transverse median and rear end thereof. The opening formed by the standard 52 registers with an opening 53 formed in the base 51. The standard 52 is of polygonal contour and has the upper terminal portion thereof enlarged, as indicated at 54 and with the rear face of the enlargement extending upwardly and rearwardly at an inclination, as indicated at 55 to form an inclined face. See Figure 7. Arranged against the lower face of the base 51 is a spacing collar 55', and positioned against said collar 55' is a washer 56, which seats on a flanged coupling member 57 and the latter is mounted upon the forward end of the carrier 32. Positioned against the lower face at the forward end of the carrier 53 is a flanged coupling member 58 which is oppositely disposed with respect to the coupling member 57. Extending downwardly through the standard 52 and base 51, as well as through the collar 55', washer 56, coupling members 57, 58 and carrier 32 as well as depending below the latter, is a pivot bolt 59 having its upper end formed with a head 60 and interposed between the latter and the top of the standard 52 is a washer 61. The lower end of the bolt 59 carries a securing nut 62, and interposed between the latter and the coupling member 58 is a washer 63. The construction set forth provides a fixed connection between the carrier 32 and the support referred to generally by the reference character 64′, and which is set up by the base 51 and standard 52 of the casting hereinbefore referred to.

The attachment can be set up with a guiding means projected laterally with respect to either side of the tractor, or with the guiding means disposed in a plane at the longitudinal center of the tractor or when the tractor is travelling over a furrow. The guiding means which is projected laterally with respect to either side of the tractor is termed a lateral guide and travels in a furrow positioned at one side of the line of travel of the tractor. The said lateral guiding means, as well as the connection therefor, is shown in Figures 1 and 2 and 5 to 9 of the drawings and it includes a pair of superposed bars 64, 65, which project forwardly from the base 51 of the support 64′, and have their forward ends upturned in a curvilinear manner and secured together as at 66. The major portion of the bars 64, 65 are arranged in spaced relation and the bar 64 projects a substantial distance from the forward end of the bar 65, as indicated at 67. The bars 64 and 65 form what may be termed a shoe. A spacing collar 68 is interposed between the bars 64 and 65 and secured therewith by a hold fast device 69. The rear ends of the bars 64, 65 are secured respectively to the upper and lower faces of the forward end of the base 51 by the hold fast devices 70, 71. Secured to the bar 64′, in proximity to the forward end of the base 51 of the support 64 is a yoke-shaped member 72, which is secured to and upon the top of the bar 64 by the hold fast devices 73. The member 72 extends lengthwise with respect to the bar 64. Secured to the member 72 is a pivot bolt 74 for a purpose to be presently referred to. Secured to the upper face of the bar 64, rearwardly of the member 72, is the flanged lower end 75 of an upwardly extending and rearwardly inclined support 76 which is secured to the upper front corner of the standard 52 by a yoke-shaped clamping device 77. The support 75 extends a substantial distance above the standard 52 and has secured to the upper end thereof a guide device 78 for an elevating and lowering member referred to generally by the reference character 79. The guide device for elevating the lowering member 79 consists of a pair of opposed plates 80, 81 arranged in spaced relation and with the plate 81 secured to the lower face of and extending transversely of the angularly disposed upper end 76′ of the support 76, as well as projecting from the side edges thereof. The plate 82 is arranged over said end portion 76′ of the support 76. The plate 81 is secured to the support 76 by the hold-fast devices 82, see Figure 9. The plates 80 and 81 are connected together by a pair of shafts 83, each carrying a guide roller 85. The end portion 76′ of the support 76 is bifurcated to provide a pair of spaced retaining arms 86 for a purpose to be presently referred to. The arms 86 have the opposed edge thereof oppositely flared as at 86′.

The elevating and lowering member 79 is formed of two sections 87, 88 and the latter is arranged forwardly with respect to the former. The section 87 consists of a cable or rope and the section 88 of a length of chain. The section 87 extends rearwardly and is of a length to be in convenient reach of the operator. The elevating and lowering element 79 travels over one of the rollers 85 when the guiding means for the tractor projects laterally with respect to one side thereof and the other guide roller 85 coacts with the elevating and lowering member when the guiding means for the tractor projects laterally with respect to the other side thereof. The section 88 of the elevating and lowering member 79 is connected to the guiding means in a manner to be presently referred to. The guiding means is pivoted at one end and this will be presently referred to and when the guiding means is elevated the section 87 passes through the guide device, as well as a portion of the section 88, and one of the links of the chain is positioned between the arms 86 whereby the guiding means is retained in an elevated position. The support 76 for the guide device, as before stated extends upwardly and at a rearward inclination, and is maintained in such position by a brace element 89 which is secured at its upper end, as at 90 to the support 76 at a point below the top thereof. The brace member 89 is formed so as to snugly engage the rear of the standard 52, and said brace member has an angularly disposed and rearwardly extending lower end or foot piece 91 which is positioned upon the upper face and the rear of the base 51. The foot piece 91 is secured to the base 51 by a hold fast device 92 and which includes a headed bolt and interposed between the head of the bolt and the base 51 is a lateral arm 93.

The steering means to provide for the guiding of the tractor and ground working device so that the latter will form a furrow in parallel relation to a previously formed furrow, is referred to generally by the reference character 94, and which pivots on an axis extending in a longitudinal direction with respect to the tractor and further pivots on a vertical axis. The guiding means 94 consists of an elongated bar 95 provided at its outer end with a sleeve 96 into which extends the inner end of an axle member 97 provided with a pair of oppositely disposed, spaced concaved disks 98, 99 which provide a pair of guide members and travel in the furrow 100. The guide members are revoluble. The axle member 97 is connected to the sleeve 98 by an eye bolt 101 provided with a securing nut 102 and to the eye bolt 101 is attached the lower end 103 of the section 88 of the elevating and lowering member 79. See Figure 1. The sleeve 96 is connected to the bar 95 by an eye bolt 104 which carries a securing nut 105 and leading from the eye bolt 104 to the hook 106 carried by the bar 64 of the shoe, see Figures 1 and 2, is a steadying chain 107 which can be adjustably connected to the hook 106, as the links of the chain 107 selectively engage with said hook. The inner end of the bar 95 has extending therein a coupling member 107 and which has its forward end secured to the rear end of the bar 95, as at 108. Preferably a cotter pin is employed for connecting the member 107 to the bar 95. See Figure 8. Mounted on the pivot bolt 74, which is carried by the member 72, is a yoke-shaped connecting member 109 which overlaps the coupling member 107 and is pivotally connected therewith, by the pivot bolt 110. A securing nut 111 is carried by the lower end of the bolt 110 and the latter extends through the members 109 and 107 as well as depends from the member 109. The pivot bolts 74 and 110 provide for the pivoting of the guiding means on an axis disposed longitudinally with respect to the tractor and also on a vertical axis. The elevating and lowering means 79 also provides for the shifting of the guiding means 94 from the left to the right side of the tractor or from the right to the left side of the tractor.

The guiding means which travel in a furrow arranged below the tractor, shown in Figures 3 and 4, is indicated generally by the reference character 111 and comprises a vertically disposed yoke 112 which is secured to as well as overlaps, the forward portion of the base 51. The securing means for the yoke is indicated at 113. Extending through, as well as being connected with, the upper portion of the yoke 112 is a pivot bolt 114. Mounted on the bolt 114 is a pair of forwardly extending upwardly curved arms 115, 116 and with the former of greater length than the latter. The arms 115 and 116 converge towards each other and the arm 116 is secured to the arm 115 at a point rearwardly with respect to the forward end of the arm 115, see Figure 3. The securing means between the arms 115 and 116 is indicated at 117. The forward end of the arm 115 carries a ring 118 for a purpose to be presently referred to. The arms 115 and 116 are arranged above the base 51 and extending transversely with respect to the arms 115 and 116 as well as projecting laterally from the arm 115 and also from the arm 116 is a yoke-shaped support 119. The support 119 is arranged forwardly, as well as being spaced from the yoke 112 and the arms 115, 116 extend through the support 119 and are maintained in spaced relation by the latter. Abutting against the arm 115, as well as depending below the same is a yoke-shaped hanger 120 and abutting against the arm 116 as well as depending below the same is a yoke-shaped hanger 121. The upper ends of the hangers 120 and 121 have the support 119 extend therethrough and said hangers further abut against the sides of the support 119. Each hanger is secured together at its top by a hold-fast device 122 and which is arranged over the support 119. Each hanger is furthermore secured together by a hold fast device 123 and which is positioned in proximity to the bottom of the support 119. Each hanger is furthermore secured together by a pair of spaced hold-fast devices 124, 125. Each hanger is formed with a circular lower end 126 and supported by the lower ends of the hangers is an axle member 127. Mounted on each end of the axle member is a concaved disk 128 which provides a guide member and travels in a furrow 129. The guide members 128 are arranged in spaced relation and are oppositely disposed with respect to each other. The hangers 120 and 121 are bodily carried with the arms 115 and 116 and the said arms 115, 116 provide what may be termed a shiftable support for the guide members 128. Pivotally connected to the shiftable support and arranged between the arms thereof is a spring-controlled locking member of yoke-shape form and is closed at its upper end and open at its lower end. The pivot for the latch member 129 is indicated at 130 and its controlling spring at 131. The closed upper end of the member 129 is provided with an eye 132 for connecting therewith a flexible pulling member 133 which passes through the ring 118. See Figure 4. Connected to the ring 118 is a flexible pulling member 135. The members 113 and 135 project rearwardly and are in convenient reach of the operator of the tractor. The supporting structure can be shifted to the dotted line position shown in Figure 4, and when in such position the latch member 129, engages over the upper end of the standard 52 and maintains the guiding means in the dotted line position as shown. To release the guiding means 111 the pulling member is drawn rearwardly to shift the latching member 129 clear of the standard 52 and the said guiding means 111 can then be lowered to the full line position shown in Figure 4.

In Figures 3 and 4 the carrier 32 is disposed at an inclination and such inclination extends upwardly from the rear end of the carrier. The carrier 32 is set up in Figure 4 in the same manner as that shown in Figures 1 and 2 with the exception that the carrier is disposed at an inclination. The parts at the rear end of the carrier 32 in Figure 4 are slightly arranged at a rearward inclination, and not perpendicular as shown in Figure 2, but the same construction of elements are employed, and it is thought unnecessary to specifically describe the connection between the rear end of the carrier shown in Figure 4 and the front axle of the tractor.

The attachment further includes an equalizing bar for retaining the casting formed of the base 51 and the standard 52, brace 89, bars 64, 65 and arms 115, 116 parallel with the tractor and further for retaining the casting, brace 89 and bars 64, 65 parallel with the tractor even when the guiding means 94 is swung to right or left of the tractor. The equalizing bar is indicated at 136 and is pivotally connected at its rear end as indicated at 137 to the end 17 of the section 12 of the member 10. The forward end of the equalizing bar 136 is pivotally connected as at 138 to the outer end of the forward lateral arm 93 which is rigidly secured to the base 51 by the hold fast device or bolt 92. See Figure 7 and also Figure 1. A brace member 139 is rigidly secured to the bar 93 and also with the base 51 by the bolt 71. See Figures 1 and 7.

Extending at right angles to the carrier 32 and further extending into the clamp 44, as well as pivotally connected therewith, as at 140, is a toothed bar 141 which extends over the equalizing bar 136 as well as projects outwardly therefrom. The bar 141 is provided with a pair of eyes 142, 143. Connected to the eye 142 and to the pivot 138 for the equalizing bar 136 is a controlling spring 145 for a notched or toothed bar 141. Connected to the eye 143 and extended rearwardly so as to be in convenient reach of the operator is a pulling member 146 for the toothed bar 141. Selectively engaging in the teeth 147 of the toothed bar 141, is a rearwardly extending steering arm 148, which is pivotally connected at 149, to the connecting arm 5 of the steering mechanism of the tractor. The arm 148 is connected with the arm 5 at the point of connection of the latter with one of the knuckles of an axle spindle. The forward end of the arm 148 is provided with a yoke 150, carrying a pin 151 which is adapted to selectively engage in the teeth 147. By pulling the bar 141 rearwardly it will clear the pin 151, carried by the steering arm 148, and the operator can turn the front wheels of the tractor, and carry the position of the carrier 32 to set the guide members, and when the pulling member 146 is released the spring 145 will pull the bar 141 forwardly and the pin 151 will engage in a different tooth of the bar 147 to maintain the carrier 32 in adjusted position.

When employing the attachment, if the furrows are to be formed at one side of the line of travel of the tractor, right or left, the first row is formed, but during such operation the guide members 98 and 99 are elevated. After the first furrow is formed the guide members 98 and 99 are positioned therein, as shown in Figure 1, so as to travel in the furrow and accurately guide the tractor to form the next furrow in parallel relation to the first made furrow. At the end of the row, the guide members are elevated, the tractor turned and the guide members re-set to travel in the last made furrow. If the guiding means is to be employed in a furrow positioned beneath the tractor, the guide members and their connections, that is to say the guide members 98 and 99 and their connections are removed and the guide members 128 and their connections are positioned with respect to the front of the carrier 32 and said guide members 128 travelling in the furrow will accurately guide the tractor.

The central guiding means, that is the guide members 128 will be used in cultivating listed corn, or any crop where the furrow is centrally of or beneath the tractor.

It is thought the many advantages of a steering attachment for tractors, in accordance with this invention, can be readily understood, and although the preferred embodiment of the invention is as illustrated and described, yet it is to be understood that changes in the details of construction can be had which will fall within the scope of the invention as claimed.

What is claimed is:

1. A steering attachment for tractors comprising a carrier extended forwardly of the tractor, a coupling structure between the rear end of said carrier and the front axle of the tractor and including a vertical and a horizontal pivot, a support secured to the forward end of the carrier, a pivoted guide means connected with said support and adapted to travel in a furrow to guide the tractor, a steering arm operated from the steering mechanism of the tractor and projecting forwardly therefrom, and a spring controlled controlling element for said arm, said element detachably connecting said arm with the carrier.

2. A steering attachment for tractors comprising a carrier extended forwardly of the tractor, a coupling structure between the rear end of said carrier and the front axle of the tractor and including a vertical and a horizontal pivot, a support secured to the forward end of the carrier, a pivoted guide means connected with said support and adapted to travel in a furrow to guide the tractor, a steering arm operated from the steering mechanism of the tractor and projecting forwardly therefrom, a spring controlled controlling element for said arm, said element detachably connecting said arm with the carrier, a lateral supporting means fixed to said support, and an equalizing bar having its forward end pivoted to said lateral supporting means and its rear end pivoted to said coupling structure.

3. A steering attachment for tractors comprising a carrier extended forwardly from the tractor, a coupling structure between the rear end of the carrier and the front axle of the tractor and providing means for pivotally connecting the carrier with the front axle of the tractor, a support secured with the forward end of the carrier, a pivoted guide means arranged forwardly of and connected with said support and adapted to travel in a furrow for guiding the tractor, a steering arm extended over the front axle of the tractor and adapted to have its rear end pivotally connected with the steering mechanism of the tractor for operation thereby, and a spring controlled toothed controlling element for said arm, said element pivotally connected to and extending at right angles with respect to the carrier and said arm provided with means selectively engaging with the teeth of said element for detachably connecting said arm with the carrier and to provide for the horizontal adjustment of the latter.

4. A steering attachment for tractors comprising a carrier extended forwardly from the tractor, a coupling structure between the rear end of the carrier and the front axle of the tractor and providing means for pivotally connecting the carrier with the front axle of the tractor, a support secured with the forward end of the carrier, a pivoted guide means arranged forwardly of and connected with said support and adapted to travel in a furrow for guiding the tractor, a steering arm extended over the front axle of the tractor and adapted to have its rear end pivotally connected with the steering mechanism of the tractor for operation thereby, a controlling element for said arm, said element pivotally connected to and extending at right angles with respect to the carrier and providing means for detachably connecting said arm with the carrier, a lateral supporting means fixed to said support, and an equalizing bar pivotally connected at its forward end to the outer end of said lateral supporting means and further pivotally connected at its rear end with said coupling structure adjacent the point of connection of the carrier with said coupling structure.

5. A steering attachment for tractors comprising a carrier extended forwardly from the front of the tractor and in the form of a beam, tractor guide means supported from the forward end of the carrier on a vertical pivot, a coupling structure between the rear end of the carrier and the front axle of the tractor including a horizontal and a vertical pivot for the carrier, a combined steering and adjusting means for the carrier connected to the steering mechanism of the tractor, said guide means bodily movable with the carrier when the latter is adjusted, a lateral support arranged at the forward end of the carrier, and an equalizing bar having its forward end pivotally connected to said lateral support and its rear end pivotally connected to said coupling structure.

6. A steering attachment for tractors comprising a carrier extended forwardly from the front of the tractor and in the form of a beam, an upwardly shiftable tractor guide means supported from the forward end of the carrier on a vertical pivot, means for pivotally connecting the rear end of the carrier with the front axle of the tractor of the vehicle, a combined steering and adjusting means for the carrier operated from the steering mechanism of the tractor, said guide means bodily shiftable with the carrier when the latter is adjusted, a lateral support arranged at the forward end of the carrier, and an equalizing bar having its forward end pivotally connected to said support and its rear end pivotally connected with means for pivotally connecting the carrier to the front axle of the vehicle.

7. A steering attachment for tractors comprising a carrier extended forwardly from the tractor and in the form of a beam, a support in the form of a base and a standard connected with the forward end of the carrier, a steering arm connected to and operated by the steering mechanism of the tractor and further connected with the carrier, means for pivotally connecting the rear end of the carrier with the front axle of the tractor, said steering arm connected with the carrier forwardly of said pivot means, a shoe connected to said base and extended forwardly therefrom, a bar disposed laterally with respect to said shoe and having its inner end pivotally supported upon the shoe, a pair of spaced revoluble tractor guide members mounted on the outer portion of said bar, and means connected to said bar and standard for selectively positioning the guide members at either side of the line of draft of the tractor.

8. A steering attachment for tractors comprising a carrier extended forwardly from the tractor and in the form of a beam, a support in the form of a base and a standard connected with the forward end of the carrier, a steering arm connected to and operated by the steering mechanism of the tractor and further connected with the carrier, means for pivotally connecting the rear end of the carrier with the front axle of the tractor, a shoe connected to said base and extended forwardly therefrom, a bar disposed laterally with respect to said shoe and having its inner end pivotally supported upon the shoe, a pair of spaced revoluble tractor guide members mounted on the outer portion of said bar, an elevating and lowering member for said guide members and providing for selectively positioning the guide members at either side of the line of draft of the tractor, a guide device for said elevating and lowering member, said guide device arranged above said support and a guide device carrier secured to the support, extended upwardly therefrom and having said guide device secured to and supported on the upper end thereof.

9. A steering attachment for tractors comprising a carrier extended forwardly from the tractor and in the form of a beam, a support in the form of a base and a standard connected with the forward end of the carrier, a steering arm connected to and operated by the steering mechanism of the tractor and further connected with the carrier, means for pivotally connecting the rear end of the carrier with the front axle of the tractor, a shoe connected to said base and extended forwardly therefrom, a bar disposed laterally with respect to said shoe and having its inner end pivotally supported upon the shoe, a pair of spaced revoluble tractor guide members mounted on the outer portion of said bar, an elevating and lowering member for said guide members and providing for selectively positioning the guide members at either side of the line of draft of the tractor, a guide device for said elevating and lowering member, said guide device arranged above said support, a guide device carrier secured to the support, extended upwardly therefrom and having said guide device secured to and supported on the upper end thereof, and means carried by said guide device and engaging in said elevating and lowering member for maintaining the guide members in an elevated position.

10. A steering attachment for tractors comprising a shiftable carrier projected forwardly from the front of the tractor, means for pivotally connecting the rear end of the carrier to the front of the front axle of the tractor, a tractor guide means for traveling in a furrow to guide the tractor, a coupling structure between said guide means and the carrier and including pivots extending at right angles with respect to each other, a steering arm connected to and operated from the steering mechanism of the tractor and adjustably connected with the carrier and providing means for shifting the latter, means for elevating the carrier, and means for positioning the guide means at each side of the line of draft of the tractor.

11. A steering attachment for tractors comprising a shiftable carrier projected forwardly from the front of the tractor, means for pivotally connecting the rear end of the carrier to the front of the front axle of the tractor, a tractor guide means for travelling in a furrow to guide the tractor, a coupling structure between said guide means and the carrier and including pivots extending at right angles with respect to each other, a steering arm connected to and operated from the steering mechanism of the tractor and adjustably connected with the carrier and providing means for shifting the latter, means for elevating the carrier, means for positioning the guide means at each side of the line of draft of the tractor, a lateral support extended from the forward portion of the carrier, and an equalizing bar having its forward end pivotally connected to the outer end of said lateral support and its rear end pivotally connected with the means for pivotally connecting the carrier with the front axle of the tractor.

12. A steering attachment for tractors comprising a carrier extended forwardly from the tractor and in the form of a beam, a support in the form of a base and a standard connected with the forward end of the carrier, a guide device, means secured to said support for supporting said guide device in an elevated position with respect to the carrier, tractor guide means travelling in a furrow for guiding the tractor, means for connecting said tractor guide means with said base and including a pair of pivots disposed at right angles with respect to each other, elevating and lowering means for said tractor guide means and travelling through said guide device and further providing for the positioning of the tractor guide means at each side of the line of draft of the tractor, a steering element connected to and operated from the steering mechanism of the tractor, and a spring controlled means connected with said carrier, intermediate the ends of the latter, and adjustably connected to said steering element.

13. A steering attachment for tractors comprising a carrier extended forwardly from the tractor and in the form of a beam, a support in the form of a base and a standard connected with the forward end of the carrier, a guide device, means secured to said support for supporting said guide device in an elevated position with respect to the carrier, tractor guide means travelling in a furrow for guiding the tractor, means for connecting said tractor guide means with said base and including a pair of pivots disposed at right angles with respect to each other, elevating and lowering means for said tractor guide means and travelling through said guide device and further providing for the positioning of the tractor guide means at each side of the line of draft of the tractor, a steering element connected to and operated from the steering mechanism of the tractor and adjustably connected with said carrier intermediate the ends of the latter, said steering element including a controlling spring, a fixed lateral support extending laterally from said base and carrier, and an equalizing bar pivotally connected at its forward end to the outer end of said fixed lateral support and having its rear end pivotally connected with the means for pivotally connecting the carrier to the front axle of the tractor.

14. A steering attachment for tractors comprising a carrier extended forwardly from the tractor and in the form of a beam, means for pivotally connecting the rear end of the carrier to the front axle of the tractor, tractor guide means connected with the forward end of the carrier and travelling in a furrow for guiding the tractor, a steering arm for the carrier, said arm connected to and operated from the steering mechanism of the tractor, and a spring-controlled adjusting connection between the forward end of said arm and said carrier intermediate the ends of the latter.

15. A steering attachment for tractors comprising a carrier extended forwardly from the tractor and in the form of a beam, means for pivotally connecting the rear end of the carrier to the front axle of the tractor, tractor guide means connected with the forward end of the carrier and travelling in a furrow for guiding the tractor, a steering arm for the carrier, said arm connected to and operated from the steering mechanism of a tractor, a spring-controlled adjusting connection between the forward end of said arm and said carrier intermediate the ends of the latter, means for elevating said tractor guide means, and said element and arm having coacting means for horizontally adjusting the carrier and for retaining it in its adjusted positions.

16. A steering attachment for tractors comprising a carrier extended forwardly from the tractor and in the form of a beam, means for pivotally connecting the rear end of the carrier to the front axle of the tractor, tractor guide means connected with the forward end of the carrier and travelling in a furrow for guiding the tractor, a steering arm for the carrier, said arm connected to and operated from the steering mechanism of the tractor, a spring controlled adjusting connection between the forward end of said arm and said carrier intermediate the ends of the latter, said tractor guide means including a vertical pivot and a pivot extending parallel to the line of draft of the tractor, said tractor guide means shifted on its vertical pivot by said carrier, and means for elevating said tractor guide means and further for positioning the same at each side of the line of draft of the tractor.

17. A steering attachment for tractors comprising a carrier extended forwardly from the tractor and in the form of a beam, means for pivotally connecting the rear end of the carrier to the front axle of the tractor, tractor guide means connected with the forward end of the carrier and travelling in a furrow for guiding the tractor, a steering arm for the carrier, said arm connected to and operated from the steering mechanism of the tractor, a spring controlled adjusting connection between the forward end of said arm and said carrier intermediate the ends of the latter, said tractor guide means including a vertical pivot and a pivot extending parallel to the line of draft of the tractor, said tractor guide means shifted on its vertical pivot by said carrier, means for elevating said tractor guide means and further for positioning the same at each side of the line of draft of the tractor, and said element and arm having coacting means for horizontally adjusting the carrier and for retaining it in its adjusted positions.

In testimony whereof, I affix my signature.

FRED L. WILLRODT.